July 22, 1930.  C. SAUZEDDE  1,771,011
WHEEL BRAKE MECHANISM
Filed June 16, 1927  2 Sheets-Sheet 1

Inventor
Claude Sauzedde
By
Attorney

July 22, 1930.  C. SAUZEDDE  1,771,011
WHEEL BRAKE MECHANISM
Filed June 16, 1927   2 Sheets-Sheet 2
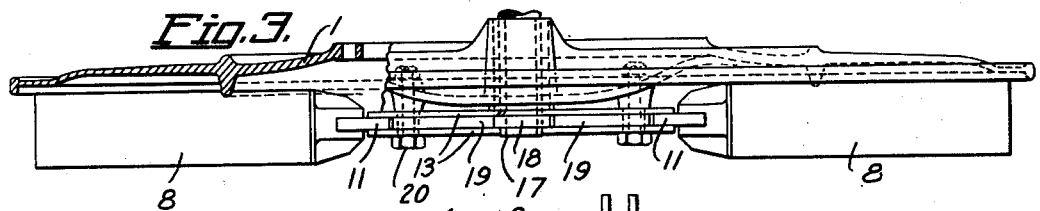
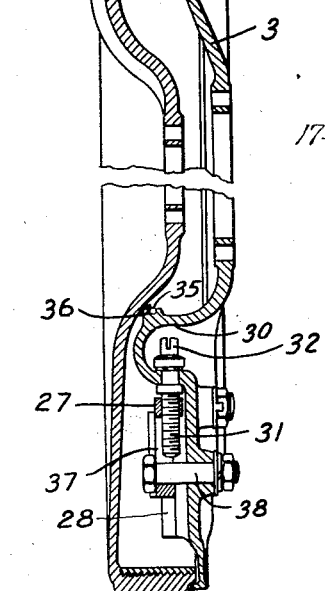
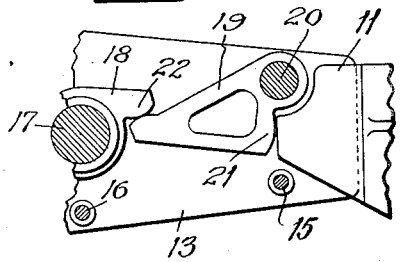
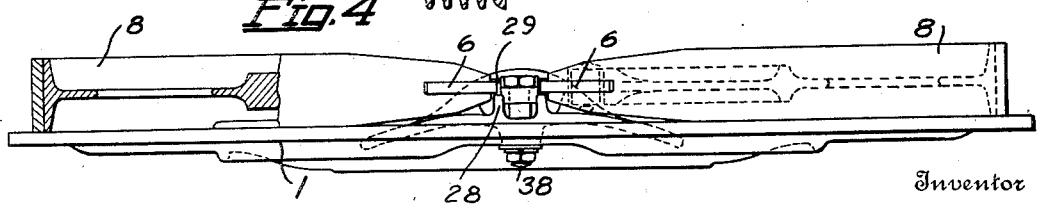
Inventor
Claude Sauzedde
By
Attorney Patented July 22, 1930

1,771,011

UNITED STATES PATENT OFFICE

CLAUDE SAUZEDDE, OF DETROIT, MICHIGAN

WHEEL BRAKE MECHANISM

Application filed June 16, 1927. Serial No. 199,177.

The present invention pertains to a novel wheel brake mechanism having the advantages described, in my co-pending application, Serial No. 115,779, filed June 14, 1926, and constructed with greater simplicity and for bringing about additional advantages in operation, particularly on the ground wheels of aircraft.

One of the added features of the present construction is that the cam system for actuating the brake shoes involves two contacting and relatively movable members having a gear tooth relation. Due to this mode of contact between these parts in their relative movement, frictional losses in the cam system are minimized. In the same cam assembly, the member acting immediately on the brake shoe is a lever actuated by the cam proper. This lever multiplies the power applied to the brake shoe so that the latter may be applied to the brake drum with great firmness.

The present invention differs further from the device mentioned above in the construction of the mechanism which compensates for wear of the brake shoes. In the present case this means constitutes primarily a wedge acting on the brake shoes and governing their normal distance from the brake drum wall. The wedge is symmetrical so that it acts equally on both shoes and is adjusted by means of a screw whereby a finely variable but sturdy construction is obtained.

The invention is fully disclosed by way of example in the following description and in the accompanying drawings, wherein—

Fig. 2 is a section on the line 2—2 of Figure 1;

Fig. 3 is a top plan view with reference to Figure 1;

Fig. 4 is a bottom plan view with reference to Figure 1;

Fig. 6 is an enlarged detail of Figure 1 showing the gear tooth surfaces.

Reference to these views will now be made by use of like characters which are employed to designate corresponding parts throughout.

Figure 1:
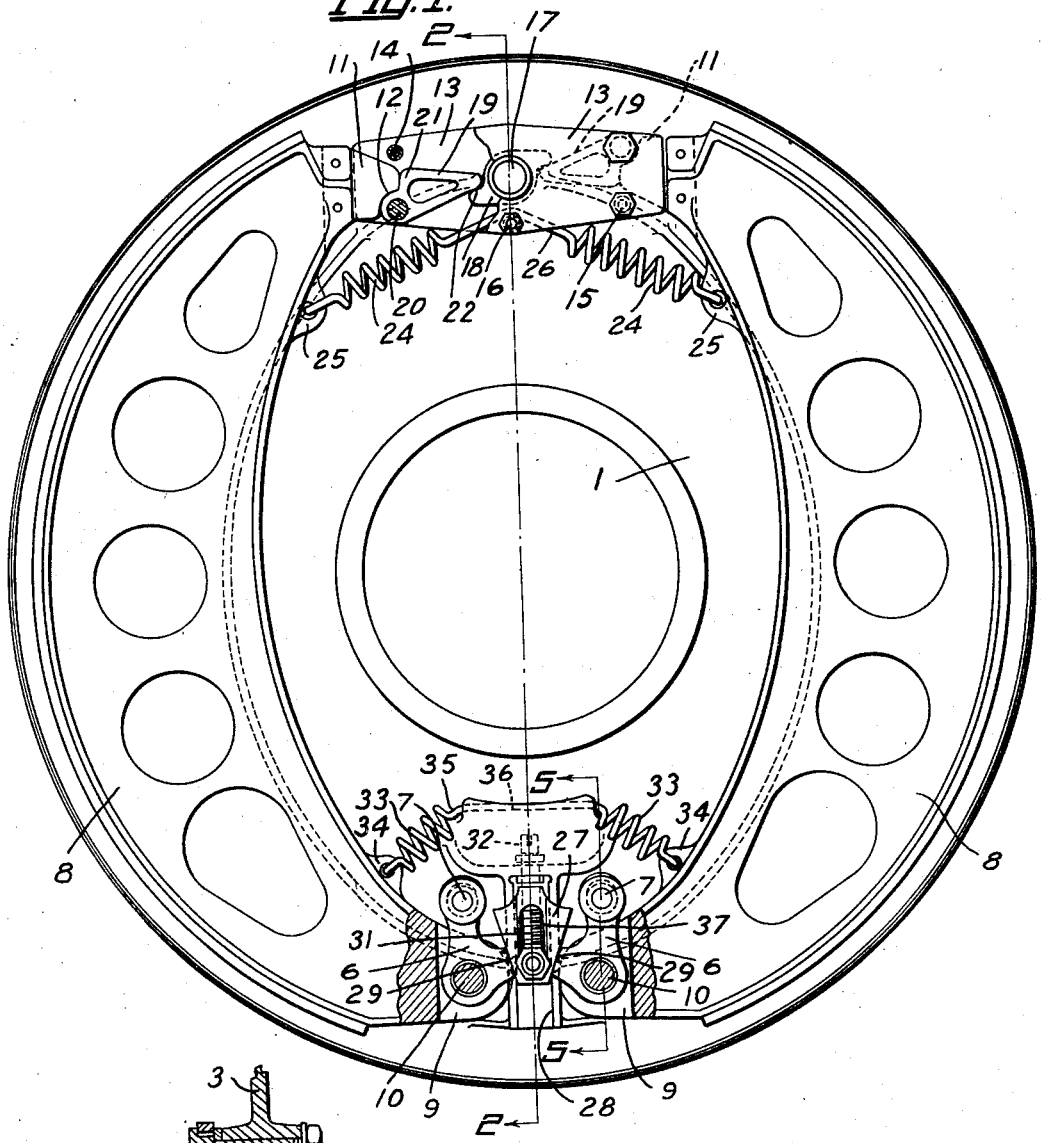
Figure 1 is a side elevation of the brake mechanism, partly in section.
Figure 5:
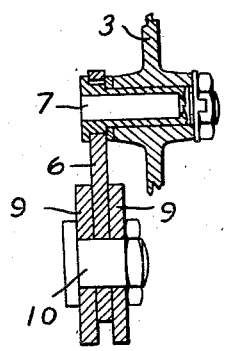
Fig. 5 is a section on the line 5—5 of Figure 1.

The brake drum comprises a body member 1 adapted to be fixed to the hub and having a marginal cylindrical wall 2 and a closure plate 3 normally fixed to the axle but which however is not put in place until the interior assembly has been completed. The outer surface of the wall 2 has heat radiating fins 4, and the inner wall has a hard liner 5 which may be screwed therein as illustrated in Figure 2.

Near the periphery of the drum, a pair of links 6 are pivotally attached to the plate 3 by means of studs 7. Arcuate brake shoes 8 adapted to engage the liner 5 have one end bifurcated as at 9 in order to receive the swinging end of the corresponding link 6. This end of the link is pivotally attached to the brake shoe by a suitable pin 10.

The remaining end of each shoe is provided with a wear piece 11 of relatively hard metal and having a cavity 12 in the edge thereof. The two pieces 11 which are in opposed relation as shown in Figure 1 are received between a pair of plates 13 fastened together and to the plate 3 by bolt and nut devices 14, 15 and 16.

An operating stub shaft 17 is journaled centrally in the plates and carries a double cam 18. Between the cam and each wear piece 11 is positioned a leverage member 19 pivotally supported between the plates on a pin 20 and having its pivoted end received in the recess 12 of the member 11 while a short extension 21 abuts the extremity of the piece 11. The free or swinging end of the lever is adapted to engage a tooth 22 of the cam for actuation thereby. The relation between this end of the lever and the tooth 22 is that of contacting involute gear teeth, so that when the shaft 17 is actuated by suitable linkage terminating in an operating lever 23 applied to the shaft, the action of the cam tooth on the lever will be accomplished with a minimum of friction between these parts. It will be evident that the frictional loses in the cam system are considerably reduced by this construction.

The length of the projection 21 acting directly on the shoe is small in comparison with the distance between the pivot point of the lever and its extremity engaging the cam. Thus, the power applied to the shaft is multiplied in its effect on the brake shoes with a proportional increase in the firmness of engagement between the brake shoes and the drum. The systems operating on the two brake shoes are identical in construction but mutually inverted as shown in Figure 1. The action at each side however is identical. The brake shoes are normally drawn inwardly of the drum into inoperative position by a spring 24 joining a pair of ears 25 on the shoes and having an unwound intermediate portion 26 passed over the stud 16.

The device for compensating wear between the rubbing parts of the shoes and the liner 5 includes a symmetrical wedge 27 slidably mounted in a guide channel 28 formed on the plate 3 between the pivoted ends of the brake shoes. It will be seen in Figure 1 that the links 6 each have a flat face 29 engaging one of the sloped sides of the wedge. Directly above the wedge, the plate 3 has an indentation 30 which forms a base in which is journaled a screw 31 threaded into the wedge and having its head 32 disposed in the indentation and readily available for engagement with a turning tool. This device permits adjustment of the wedge diametrically of the drum whereby the spacing between the swinging ends of the links 6 is governed. The flat faces 29 of the links are normally held firmly against the sloped sides of the wedge by a spring 33 connecting ears 34 at the lower ends of the shoes and having a straight intermediate portion 35 received in a groove 36 formed on the top of the depression 30. The wedge has a slot 37 receiving a bolt and nut device 38 fixed to the plate 3 and holding the wedge against the plate.

Although specific embodiments of the invention have been illustrated and described, it will be understood that various alterations in the details of construction may be made without departing from the scope of the invention as indicated by the appended claims.

What I claim is:—

1. A brake mechanism comprising a drum, a plate, a brake shoe having one end pivotally attached to the plate, a lever pivoted to the plate and engaging the free end of the shoe, and a cam pivoted to the plate and having a gear tooth contact with said lever.

2. A brake mechanism comprising a drum, a plate, a pair of brake shoes each having one end pivotally attached to the plate, levers pivoted to the plate and engaging the free ends of said shoes, and cams pivoted to said plate and having gear tooth contact with said levers.

3. A brake mechanism comprising a drum, a plate, a brake shoe having one end pivoted to the plate, a cam spaced from the shoe, a lever engaging said cam and the free end of the shoe, the distance from the pivot point of said lever to the point of contact with the shoe end being considerably less than the distance from said pivot point to the point of contact with the cam, said lever having a gear tooth contact with said cam.

4. A brake mechanism comprising a drum, a plate, a pair of brake shoes each having one end pivotally attached to the plate, a cam spaced from the shoes, a pair of levers engaging said cam and the free ends of said shoes, the distance from the pivot point of each lever to the pivot point of contact with the shoe end being considerably less than the distance from said pivot point to the point of contact with the cam, said levers having gear tooth contact with said cam.

5. A brake mechanism comprising a drum, a plate, a pair of links having a floating pivotal connection to the plate, brake shoes pivoted to the links, a wedge slidably supported by said plate and engaging said links, and means for separating and retracting the free ends of said shoes.

In testimony whereof I affix my signature.

CLAUDE SAUZEDDE.